US012309671B2

United States Patent
Reeves et al.

(10) Patent No.: US 12,309,671 B2
(45) Date of Patent: May 20, 2025

(54) METHOD OF OPERATING A WIRELESS TELECOMMUNICATIONS NETWORK

(71) Applicant: BRITISH TELECOMMUNICATIONS PUBLIC LIMITED COMPANY, London (GB)

(72) Inventors: Andrew Reeves, London (GB); Ian Neild, London (GB); MohammadHossein Zoualfaghari, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/708,489

(22) PCT Filed: Oct. 11, 2022

(86) PCT No.: PCT/EP2022/078200
§ 371 (c)(1),
(2) Date: May 8, 2024

(87) PCT Pub. No.: WO2023/083541
PCT Pub. Date: May 19, 2023

(65) Prior Publication Data
US 2025/0119713 A1   Apr. 10, 2025

(30) Foreign Application Priority Data
Nov. 9, 2021  (GB) .................................... 2116053

(51) Int. Cl.
*H04W 4/20*    (2018.01)
*H04W 48/10*   (2009.01)
*H04W 84/12*   (2009.01)

(52) U.S. Cl.
CPC ............. *H04W 4/20* (2013.01); *H04W 48/10* (2013.01); *H04W 84/12* (2013.01)

(58) Field of Classification Search
CPC ........ H04W 4/20; H04W 48/10; H04W 84/12
See application file for complete search history.

(56) References Cited

U.S. PATENT DOCUMENTS

| 7,277,547 B1 | 10/2007 | Delker et al. |
| 8,315,615 B2 | 11/2012 | Kalhan et al. |
| (Continued) | | |

FOREIGN PATENT DOCUMENTS

| CN | 104093164 A | 10/2014 |
| CN | 204168311 U | 2/2015 |
| (Continued) | | |

OTHER PUBLICATIONS

International Preliminary Report on Patentability dated May 23, 2024, issued for International Application No. PCT/EP2022/078200 (12 pages).

(Continued)

*Primary Examiner* — Brandon J Miller
(74) *Attorney, Agent, or Firm* — Nixon & Vanderhye P.C.

(57) ABSTRACT

A method of operating a wireless telecommunications network, said network comprising a plurality of User Equipment devices, UEs, a Wireless Access Point, WAP, and a Wireless Local Area Network, WLAN, provided by means of the WAP, the method comprising the steps of: allocating, to each of the plurality of UEs, an item of information; encoding, by code-division multiplexing, the allocated items of information, thereby to output a signal string; assigning to the WLAN a network identifier, wherein said network identifier is derived from the output signal string; broadcasting, by means of the WAP, the assigned network identifier; retrieving, by means of each of the UEs, the signal string (Continued)

from the broadcast network identifier; and subsequently performing, by each of the UEs, code-division demultiplexing upon the retrieved signal string, each given UE thereby outputting the item of information allocated to that given UE. Methods of operating the UE and WAP are also described, as well as the wireless telecommunications network, UE and the WAP.

14 Claims, 4 Drawing Sheets

(56) References Cited

U.S. PATENT DOCUMENTS

| | | | |
|---|---|---|---|
| 8,737,363 | B2 | 5/2014 | Ozluturk et al. |
| 9,949,120 | B2 | 4/2018 | Liu et al. |
| 10,009,955 | B2 | 6/2018 | Zhang et al. |
| 10,292,027 | B2 | 5/2019 | Goluboff |
| 10,298,581 | B2 | 5/2019 | Shah et al. |
| 10,334,438 | B2 | 6/2019 | Iyer et al. |
| 10,635,133 | B2 | 4/2020 | Begley |
| 2004/0253969 | A1 | 12/2004 | Nguyen et al. |
| 2005/0286456 | A1* | 12/2005 | McNew ............... H04W 48/12 370/312 |
| 2008/0198823 | A1 | 8/2008 | Shiu et al. |
| 2008/0220741 | A1 | 9/2008 | Hung |
| 2010/0214065 | A1* | 8/2010 | Maltseff ............ G06K 7/10366 235/492 |
| 2010/0309815 | A1 | 12/2010 | Yepez et al. |
| 2013/0103807 | A1 | 4/2013 | Couto et al. |
| 2015/0050906 | A1 | 2/2015 | Yuasa |
| 2016/0087811 | A1 | 3/2016 | Yin et al. |
| 2016/0249287 | A1 | 8/2016 | Xie et al. |
| 2017/0019390 | A1 | 1/2017 | Gu |
| 2017/0055315 | A1 | 2/2017 | Lin |
| 2017/0245234 | A1 | 8/2017 | Bradish |
| 2017/0347359 | A1 | 11/2017 | Yang et al. |
| 2018/0176771 | A1 | 6/2018 | Yang et al. |
| 2018/0376448 | A1 | 12/2018 | Wild et al. |
| 2020/0037134 | A1 | 1/2020 | Wheeler |
| 2020/0275466 | A1 | 8/2020 | Hodroj |
| 2021/0315010 | A1 | 10/2021 | Hsu et al. |
| 2021/0400443 | A1 | 12/2021 | Wheeler |
| 2022/0104291 | A1* | 3/2022 | Wheeler ............... H04W 76/15 |

FOREIGN PATENT DOCUMENTS

| | | | |
|---|---|---|---|
| CN | 104796888 | A | 7/2015 |
| CN | 104869612 | A | 8/2015 |
| CN | 105764050 | A | 7/2016 |
| CN | 105792315 | A | 7/2016 |
| CN | 106304409 | A | 1/2017 |
| CN | 106572465 | A | 4/2017 |
| CN | 106847264 | A | 6/2017 |
| CN | 107529205 | A | 12/2017 |
| CN | 104981000 | B | 6/2018 |
| CN | 108391238 | A | 8/2018 |
| CN | 108834137 | A | 11/2018 |
| CN | 109547266 | A | 3/2019 |
| CN | 110366229 | A | 10/2019 |
| CN | 110460995 | A | 11/2019 |
| CN | 110557305 | A | 12/2019 |
| CN | 110730043 | A | 1/2020 |
| CN | 112738867 | A | 4/2021 |
| DE | 102021134386 | A1 | 9/2022 |
| EP | 1576444 | A0 | 9/2005 |
| EP | 1871072 | B1 | 6/2015 |
| EP | 3122144 | B1 | 12/2018 |
| EP | 3664491 | B1 | 6/2022 |
| GB | 201611859 | | 8/2016 |
| GB | 2552016 | A | 1/2018 |
| GB | 2607948 | A | 12/2022 |
| JP | 2013222993 | A | 10/2013 |
| JP | 2015104017 | A | 6/2015 |
| JP | 2017194891 | A | 10/2017 |
| KR | 20100048986 | A | 5/2010 |
| KR | 101964983 | B1 | 4/2019 |
| KR | 101980039 | B1 | 5/2019 |
| WO | 2004059450 | A1 | 7/2004 |
| WO | 2009016368 | A2 | 2/2009 |
| WO | 2015063146 | A1 | 5/2015 |
| WO | 2016180062 | A1 | 11/2016 |
| WO | 2018227715 | A1 | 12/2018 |
| WO | 2019048857 | A1 | 3/2019 |
| WO | 2019233311 | A1 | 12/2019 |
| WO | 2020066627 | A1 | 4/2020 |
| WO | 2022067274 | A1 | 3/2022 |

OTHER PUBLICATIONS

International Preliminary Report on Patentability dated Dec. 5, 2024, issued for International Application No. PCT/EP2023/059799 (8 pages).
Combined Search and Examination Report under Sections 17 and 18(3) dated Oct. 31, 2022, issued for GB Application No. GB2207757.2 (5 pages).
Combined Search and Examination Report under Sections 17 and 18(3) dated Dec. 2, 2021, issued for GB Application No. GB2108742.4 (7 pages).
Combined Search and Examination Report under Sections 17 and 18(3) dated Apr. 19, 2022, issued for GB Application No. GB2116053.6 (7 pages).
Combined Search and Examination Report under Sections 17 and 18(3) dated Jul. 20, 2022, issued for GB Application No. GB2201522.6 (5 pages).
Combined Search and Examination Report under Sections 17 and 18(3) dated Feb. 20, 2023, issued for GB Application No. GB2301541.5 (4 pages).
Exam Report for GB Application No. GB2201522.6, dated Sep. 30, 2022 (2 pages).
Combined Search and Examination Report under Sections 17 and 18(3) dated Jul. 6, 2021, issued for GB Application No. GB2104045.6 (5 pages).
International Search Report and Written Opinion of the International Searching Authority dated Jul. 7, 2023, issued for International Application No. PCT/EP2023/059799 (13 pages).
International Preliminary Report on Patentability dated Oct. 5, 2023, issued for International Application No. PCT/EP2022/054265 (10 pages).
International Preliminary Report on Patentablity dated Dec. 28, 2023, issued for International Application No. PCT/EP2022/062584 (7 pages).
International Search Report and Written Opinion of the International Searching Authority dated Sep. 8, 2022, issued for International Application No. PCT/EP2022/062584 (10 pages).
International Search Report and Written Opinion of the International Searching Authority dated Apr. 11, 2023, issued for International Application No. PCT/EP2023/050572 (17 pages).
Extended European Search Report dated Nov. 21, 2022, issued for European Application No. 22175623.2 (8 pages).
International Search Report and Written Opinion of the International Searching Authority dated Jul. 11, 2022, issued for International Application No. PCT/EP2022/054265 (16 pages).
International Search Report and Written Opinion of the International Searching Authority dated Feb. 7, 2023, issued for International Application No. PCT-EP2022-078200 (17 pages).
International Preliminary Report on Patentability dated Aug. 22, 2024, issued for International Application No. PCT/EP2023/050572 (11 pages).
Patents Act 1977: Examination Report under Section 18(3) dated Sep. 12, 2024, issued for GB Application No. GB2116053.6 (3 pages).
Patents Act 1977: Intention to Grant under Section 18(4) dated Sep. 24, 2024, issued for GB Application No. GB2116053.6 (2 pages).

* cited by examiner

METHOD OF OPERATING A WIRELESS TELECOMMUNICATIONS NETWORK

CROSS-REFERENCE TO RELATED APPLICATIONS

This application is the U.S. national phase of International Application No. PCT/EP2022/078200 filed Oct. 11, 2022 which designated the U.S. and claims priority to GB 2116053.6 filed Nov. 9, 2021, the entire contents of each of which are hereby incorporated by reference.

FIELD OF INVENTION

The present invention relates to a method of operating a wireless telecommunications network, and to a telecommunications network therefor, and to components thereof.

BACKGROUND

Wireless Access Points (WAPs) may facilitate data connectivity between a wide area network (e.g. a fixed-access broadband network) and wireless communication devices (herein also referred to as "User Equipment", UE).

To do so, WAPs provide Wireless Local Area Networks (WLANs) that work over a radio frequency spectrum with low transmit power, typically providing a range of several meters. For example, the WLAN is available to be based on any one of the IEEE® 802.11 family of standards (which form the basis for Wi-Fi®).

A UE is available to connect to WLANs provided by the WAP. However, in order for a UE to connect to a WLAN, the UE must first identify the WAP providing the WLAN, as well as identify the WLAN. For example, in the case of a Wi-Fi-based WLAN, a Service Set IDentifier (SSID) may be used to identify a WLAN, in which a WAP will normally publicly broadcast the SSID. When broadcast, these SSIDs can be viewed by all devices in the locality.

A large number of UEs are available to connect to a WAP, and these UEs may be managed by a remote Device Management System (DMS), that is provided as part of: the WAP; the wide area network; and/or a remote device accessible via the wide area network. Such management is in particular desirable for UEs having resource and practical constraints (e.g. battery, physical accessibility, and low compute resources), such as in the form of Internet of Things (IoT) devices, and the management may take the form of controlling and configuring the UEs.

To do so, an authenticated connection may be established between a UE and the DMS, via the WLAN. The DMS can then communicate instructions directly, and serially, to each UE via the WLAN. For example, communicating ten different instructions to ten different UEs would require the WAP serially transmitting the ten instructions to each of the UEs, with each transmission occupying radio resources. Given an envisaged increase in the number of UEs requiring management by a DMS, this existing process may suffer, at least, from poor scalability.

It is therefore an aim of the present invention to at least alleviate this aforementioned problem.

STATEMENTS OF INVENTION

According to a first aspect of the present invention, there is provided: a method of operating a wireless telecommunications network, said network comprising a plurality of User Equipment devices, UEs, a Wireless Access Point, WAP, and a Wireless Local Area Network, WLAN, provided by means of the WAP, the method comprising the steps of: allocating, to each of the plurality of UEs, an item of information; encoding, by code-division multiplexing, the allocated items of information, thereby to output a signal string; assigning to the WLAN a network identifier, wherein said network identifier is derived from the output signal string; broadcasting, by means of the WAP, the assigned network identifier; retrieving, by means of each of the UEs, the signal string from the broadcast network identifier; and subsequently performing, by each of the UEs, code-division demultiplexing upon the retrieved signal string, each given UE thereby outputting the item of information allocated to that given UE.

Preferably, the encoding is performed upon all allocated items of information (together) so as to output only a single signal string, and wherein the network identifier is derived from said single signal string. Preferably, the demultiplexing is performed so that each of the UEs outputs only the item of information assigned to that UE. As used herein, the term "User Equipment" is preferably not to be construed as being limited to usage in relation to cellular telecommunications. Optionally, the UE is not connected, and does not connect, to the WLAN, and may be connected to another WLAN, which may be provided by another WAP.

According to another aspect of the invention, there is provided a method of operating a Wireless Access Point, WAP, said WAP being provided as part of a wireless telecommunications network, and the WAP providing a Wireless Local Area Network, WLAN, for a plurality of User Equipment devices, UEs, to each of which an item of information is allocated, and wherein the allocated items of information are encoded, by code-division multiplexing, thereby to output a signal string, and the method comprising the steps of: assigning to the WLAN a network identifier, wherein said network identifier is derived from the output signal string; and broadcasting the assigned network identifier.

Preferably, the method further comprises the step/s of: the WAP and/or a device that is remote to, and in communication via the wireless telecommunications network with, the WAP, allocating each item of information to each of the UEs; and/or generating the signal string (i.e. performing the encoding).

According to yet another aspect of the invention, there is provided a method of operating User Equipment, UE, in a wireless telecommunications network comprising a plurality of UEs, said plurality including the operated UE, a Wireless Access Point, WAP, and a Wireless Local Area Network, WLAN, provided by means of the WAP, wherein the WAP is configured to broadcast a network identifier for the WLAN, wherein a signal string is derivable from the network identifier, and wherein an item of information allocated to each of the plurality of UEs is encoded within the signal string by means of code-division multiplexing, the method comprising the steps of: identifying the broadcast network identifier; retrieving the signal string from the broadcast network identifier; and subsequently performing code-division demultiplexing upon the retrieved signal string, thereby to output the item of information allocated to the UE.

Preferably, each item of information allocated to each of the UEs is different; that is, each item of information may be unique amongst the plurality of UEs, and each unique item of information is allocated specifically, and only, to a given one of the UEs.

Preferably, each of the UEs is allocated a unique spreading code, and wherein the code-division multiplexing and demultiplexing is performed using the unique spreading code/s. Preferably, all of the spreading codes are mutually orthogonal. Preferably, all of the spreading codes are synchronous or asynchronous (pseudorandom). Preferably, all of the spreading codes have a cross-correlation equal to zero. Preferably, the spreading code/s and the item/s of information are in binary form, and more preferably comprise a different number of digits. All of the spreading codes may comprise the same number of digits. Preferably, the encoding comprises performing a XOR function upon the unique corresponding spreading codes and allocated items of information for each of the UEs, and more preferably comprises a summation of each output of the XOR function, thereby to generate the signal string. Optionally, the method further comprises the step of retrieving a unique identifier for each of the UEs, wherein each item of information is assigned against the unique identifier of the UE to which a given item of information is allocated. Optionally, the unique identifier is a/the: unique spreading code; Media Access Control address; and/or IMSI. Optionally, the spreading codes are communicated between the WAP and the plurality of UEs, and more preferably via the, or another, WLAN. Preferably, the spreading codes, and/or the allocation of spreading codes to UEs, is secret, and more preferably are encrypted.

Preferably, the unique item of information comprises an instruction. Preferably, the instruction is pre-defined. Preferably, the instruction is a UE-executable instruction, which may subsequently be executed by the UE. Preferably, the instruction is associated with a unique instruction code (or identifier), and wherein the code-division multiplexing and demultiplexing is performed upon said instruction code, and more preferably the unique instruction code is (only) numerical. Preferably, the unique instruction code, and/or the allocation of an instruction code to a corresponding instruction, is secret, and more preferably is encrypted. Preferably, the WAP and each of the UEs comprise mapping information associating the instruction and the instruction code, and more preferably said mapping information is communicated between the WAP and the plurality of UEs, and still more preferably via the, or another, WLAN. Optionally, the information is an ASCII symbol or an ASCII string, and wherein the ASCII string is a password or access credentials, and for example for accessing the wireless telecommunications network, and specifically for accessing another WLAN. Preferably, the instruction is an instruction for a UE not to perform an, or any, action.

Preferably, the method is performed without the UE/s connecting, or being connected, to the WLAN. Preferably, at least one of the UEs is unable (optionally, ever) to connect, or forbidden from connecting, to the WLAN. Alternatively, at least one of the UEs may connect to the WLAN, and preferably having been authenticated by the WAP. Preferably, the WLAN provides no onward connection for the plurality of UEs to a wide area network accessible via the WAP.

Preferably, the network identifier is a Service Set Identifier. Optionally, the network identifier comprises the signal string, and may only consist of the signal string. Optionally, the network identifier comprises the signal string and a pre-defined code for causing each of the UEs to perform retrieval and code-division demultiplexing of the signal string. Optionally, the network identifier is a Basic Service Set Identifier (BSSID).

Preferably, the signal string is encrypted so as to generate an encrypted signal string that is decryptable by each of the UEs, and wherein the network identifier is derived from said encrypted signal string.

According to still another aspect of the invention, there is provided a computer-readable carrier medium comprising a computer program, which, when the computer program is executed by a computer, causes the computer to carry out the steps of any of the methods described above.

According to yet another aspect of the invention, there is provided a wireless telecommunications network comprising: a plurality of User Equipment devices, UEs; a Wireless Access Point, WAP; a Wireless Local Area Network, WLAN, provided by means of the WAP, and identifiable by each of the UEs; at least one processor configured to: allocate to each of the UEs an item of information; encode, by code-division multiplexing, the allocated items of information, thereby to output a signal string; and assign to the WLAN a network identifier, wherein said network identifier is derived from the output signal string; and wherein the WAP is configured to broadcast, in association with the WLAN, the assigned network identifier; and wherein each of the UEs is configured to: retrieve the signal string from the broadcast network identifier; and subsequently perform code-division demultiplexing upon the retrieved signal string, thereby to output the item of information allocated to the given UE. Preferably, the at least one processor is provided as part of the WAP and/or a device remote to, and in communication with, the WAP. Optionally, the wireless telecommunications network further comprises, accessible to the WAP, a: fixed access wide area network; cellular wide area network; satellite network; and/or hybrid network. Optionally, the WLAN operates in accordance with standards based on: Wi-Fi; Wi-Max; Zigbee; and/or Bluetooth.

According to yet further aspect there is provided a Wireless Access Point, WAP, comprising: a Wireless Local Area Network, WLAN, interface for providing a WLAN for a plurality of User Equipment devices, UEs, and for broadcasting a network identifier associated with said WLAN; a receiver for receiving a signal string, said signal string being the output of items of information, allocated to each of the plurality of UEs, that are encoded by code-division multiplexing; and a processor configured to: instruct the WLAN interface to assign, for the WLAN, a network identifier derived from the received signal string; and to cause the WLAN interface to broadcast the assigned network identifier. Optionally, the receiver forms a part of the processor, and wherein the processor is further configured to perform: allocation of an item of information to each UE; and/or the encoding of the allocated items of information.

According to another aspect of the invention, there is provided User Equipment, UE, operable within a wireless telecommunications network comprising a plurality of UEs, said plurality including the UE, and said UE comprising: a Wireless Local Area Network, WLAN, interface for connecting to a WLAN, as provided by a Wireless Access Point, WAP, and for identifying a network identifier of the WLAN, as broadcast by the WAP, wherein a signal string is derivable from the network identifier, and wherein an item of information allocated to each of the UEs is encoded within the signal string by means of code-division multiplexing; and a processor configured to: derive the signal string from the broadcast network identifier; and perform code-division demultiplexing upon the signal string, thereby to output the item of information allocated to the UE.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a method of operating a wireless telecommunications network, a method of operating a Wireless Access Point, a method of operating User Equipment, User Equipment, a Wireless Access Point, and a wireless telecommunications network, as described herein and/or substantially as illustrated with reference to the accompanying drawings. The present invention is now described, purely by way of example, with reference to the accompanying diagrammatic drawings, in which:

SPECIFIC DESCRIPTION

Figure 1:
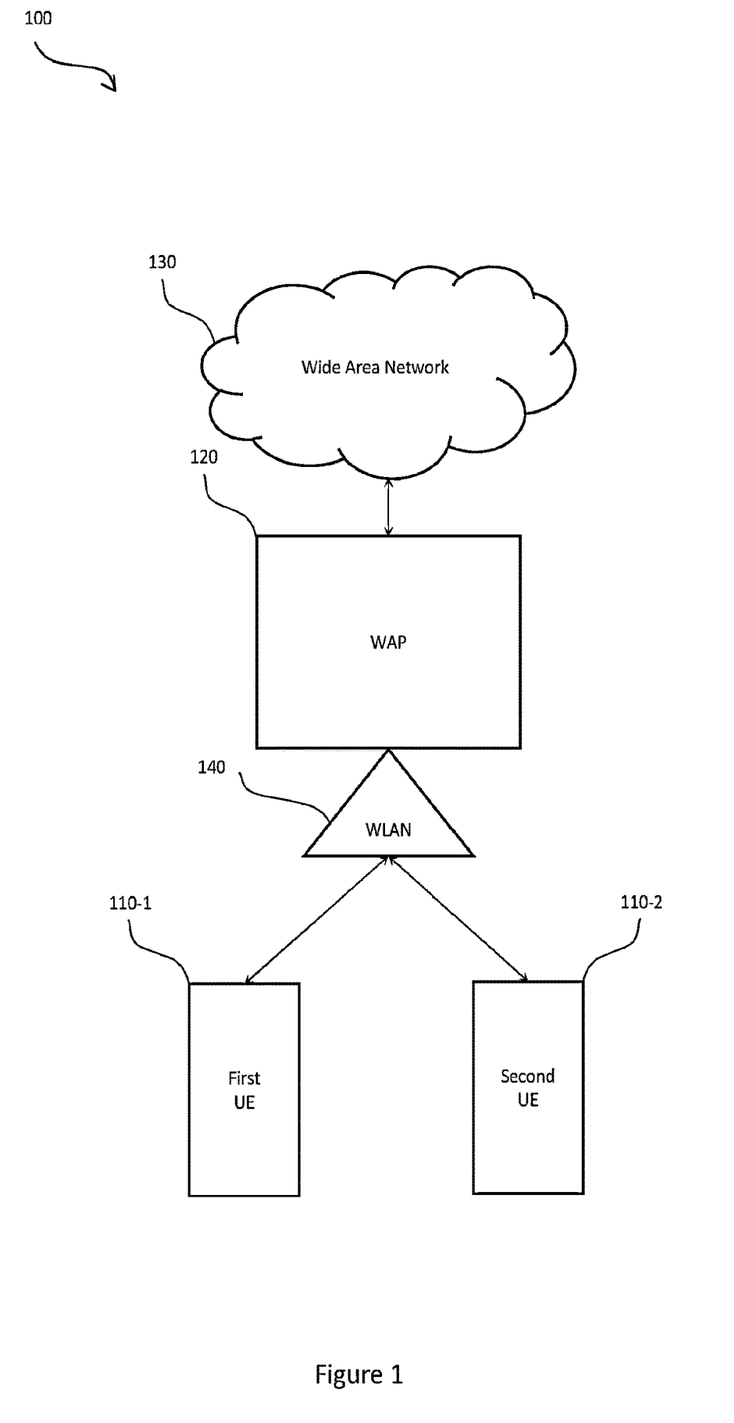
FIG. 1 is a schematic diagram of an exemplary wireless telecommunications network.

FIG. 1 shows an exemplary wireless telecommunications network 100, which comprises: a set of a plurality of wireless telecommunication devices (or User Equipment devices, UEs) 110; a Wireless Access Point (WAP) 120; and a wide area network 130.

The WAP 120 is configured to generate a Wireless Local Area Network (WLAN) 140, to which each of the UEs 110 is available to connect.

In one example, the WAP is a wireless router, gateway, edge device, extender and/or repeater, and the WLAN is available to operate based on any of the IEEE® 802.11 family of standards. The UEs are available to be in the form of any electronic communications device incorporating a WLAN interface, and in particular a/an: personal computer (laptop or desktop); mobile telecommunications device; Internet of Things (IoT) device; wireless repeater; and/or wireless extender.

The WAP 120 is connected (e.g. via an Ethernet connection) to the wide area network 130, which comprises, for example, a fixed-access broadband network and/or a cellular network. As a result, the UE 110 is available to connect, via the WLAN 140, to the wide area network 130, and in turn to, for example, the Internet.

The WAP 120 is configured to broadcast a network identifier that identifies the WLAN 140 to the UEs 110; this network identifier is in the form of a Service Set IDentification (SSID), which is a configurable text-based identifier.

The UEs 110 are located sufficiently proximate to the WAP 120 so as to be within wireless range of the WAP, and therefore the WLAN 140 is detectable and identifiable to the UEs.

Figure 2:
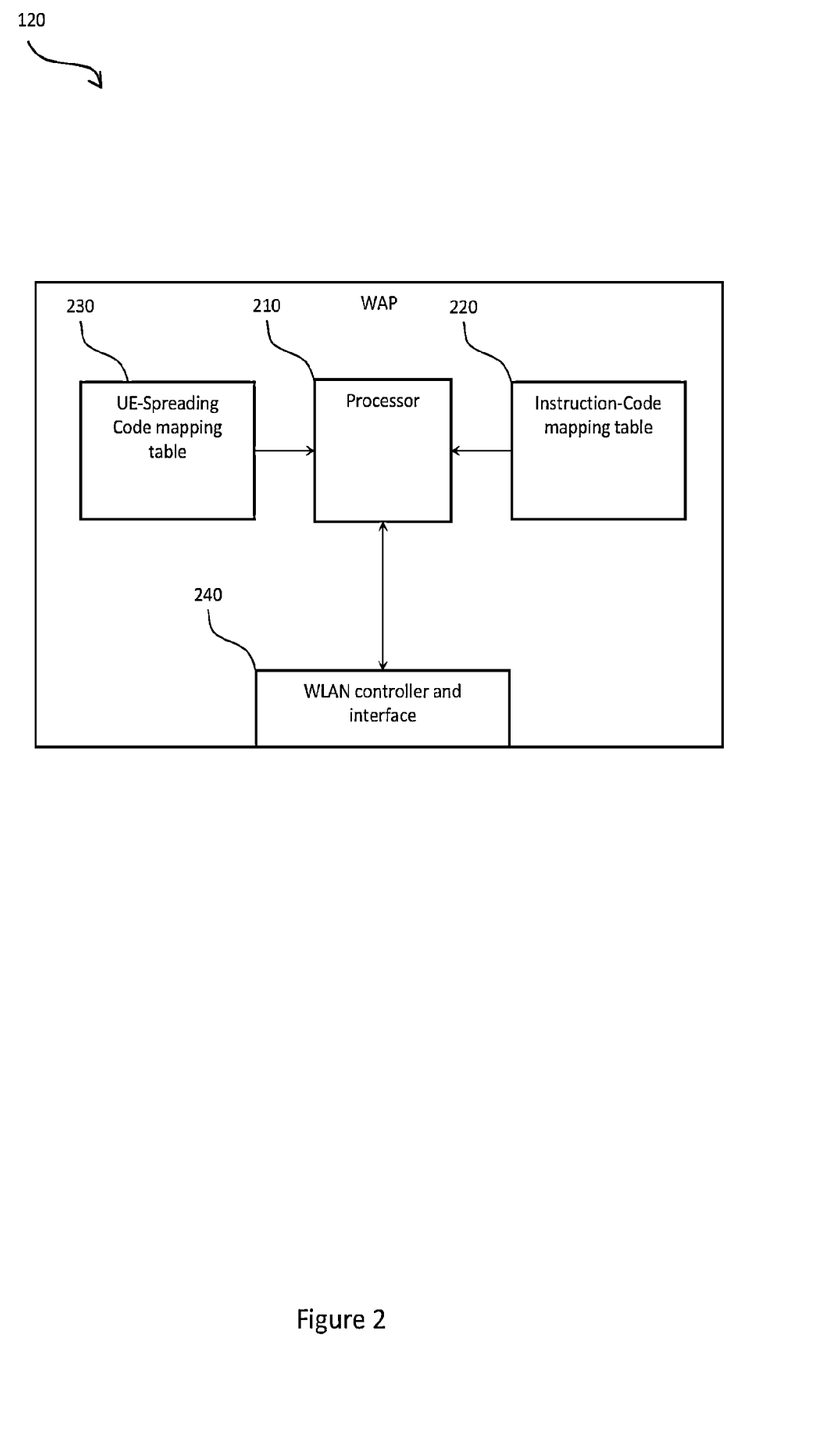
FIG. 2 is a schematic diagram of a Wireless Access Point of the wireless telecommunications network.

In more detail, and with reference to FIG. 2, the WAP 120 comprises a/an: processor 210; WAP instruction-code mapping table 220; UE-spreading code mapping table 230; and WLAN controller and interface 240.

The WAP instruction-code mapping table 220 provides a one-to-one association between a UE-executable instruction and a unique numerical instruction code (e.g. a binary numerical string). An exemplary WAP instruction-code mapping table is provided in Table 1, as follows:

TABLE 1

| UE-executable instruction | Instruction Code |
|---|---|
| No instructions | 000 |
| Reboot | 100 |
| Update | 101 |
| Sleep | 011 |
| Reset network configurations | 111 |

The UE-spreading code mapping table 230 provides an association between a unique identifier of each UE 110, in which the unique identifier is detectable by the WAP, and a unique numerical spreading code (e.g. a binary string) associated with each UE. For example, the unique identifier for each UE is a Media Access Control (MAC) address. All spreading codes in the table 230 are mutually orthogonal.

For example, the first and the second UEs (specifically the unique identifiers associated with each such UE) are associated in the table 230 with the spreading codes "0011" and "0000", respectively.

The WLAN controller and interface 240 comprises a communication interface for establishing the WLAN 140, as well as a controller for controlling operation of said interface, and in particular for configuring, and causing broadcasting of, the network address of the WLAN.

The processor 210 is in communication with the WAP Instruction-Code mapping table 220, UE-spreading code mapping table 230, and the WLAN controller and interface 240.

Figure 3:
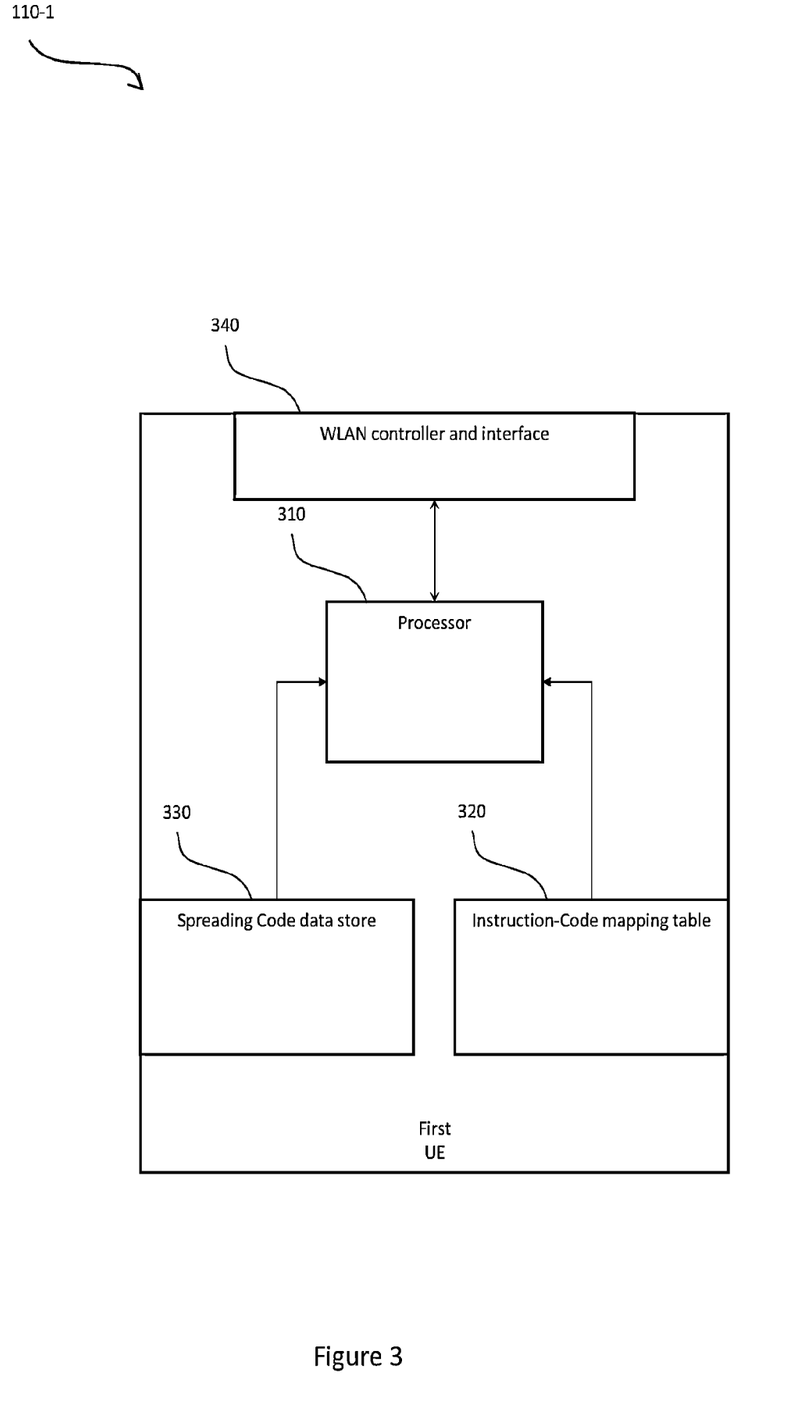
FIG. 3 is a schematic diagram of a User Equipment device of the wireless telecommunications network.

In more detail, and with reference to FIG. 3, the first UE comprises a/an: processor 310; UE instruction-code mapping table 320; spreading code data store 330; and WLAN controller and interface 340.

The UE instruction-code mapping table 320 is identical (at least in part) to the WAP Instruction-Code mapping table 220. Accordingly, to the extent that each UE and the WAP comprise the same mappings between instructions and instruction codes, communication of an intended instruction from the WAP to the UEs is achievable.

The spreading code data store 330 is in the form of memory that stores the unique spreading code for the first UE 110-1 (e.g. "0011").

The WLAN controller and interface 340 comprises a communication interface for utilising the WLAN 140, and in particular for detecting the network identifier of the WLAN and for transmitting the unique identifier associated with the first UE, as well as a controller for controlling operation of said interface.

The second UE 110-2 has a corresponding configuration to the first UE 110-1, albeit that the spreading code data store for the second UE stores, for use by the second UE, the unique spreading code for the second UE (e.g. "0000").

It will be appreciated that the WAP 120 and the UEs 110 comprise further components to those shown in and described with reference to FIGS. 2 and 3 respectively, but these further components have been omitted for conciseness.

Figure 4:
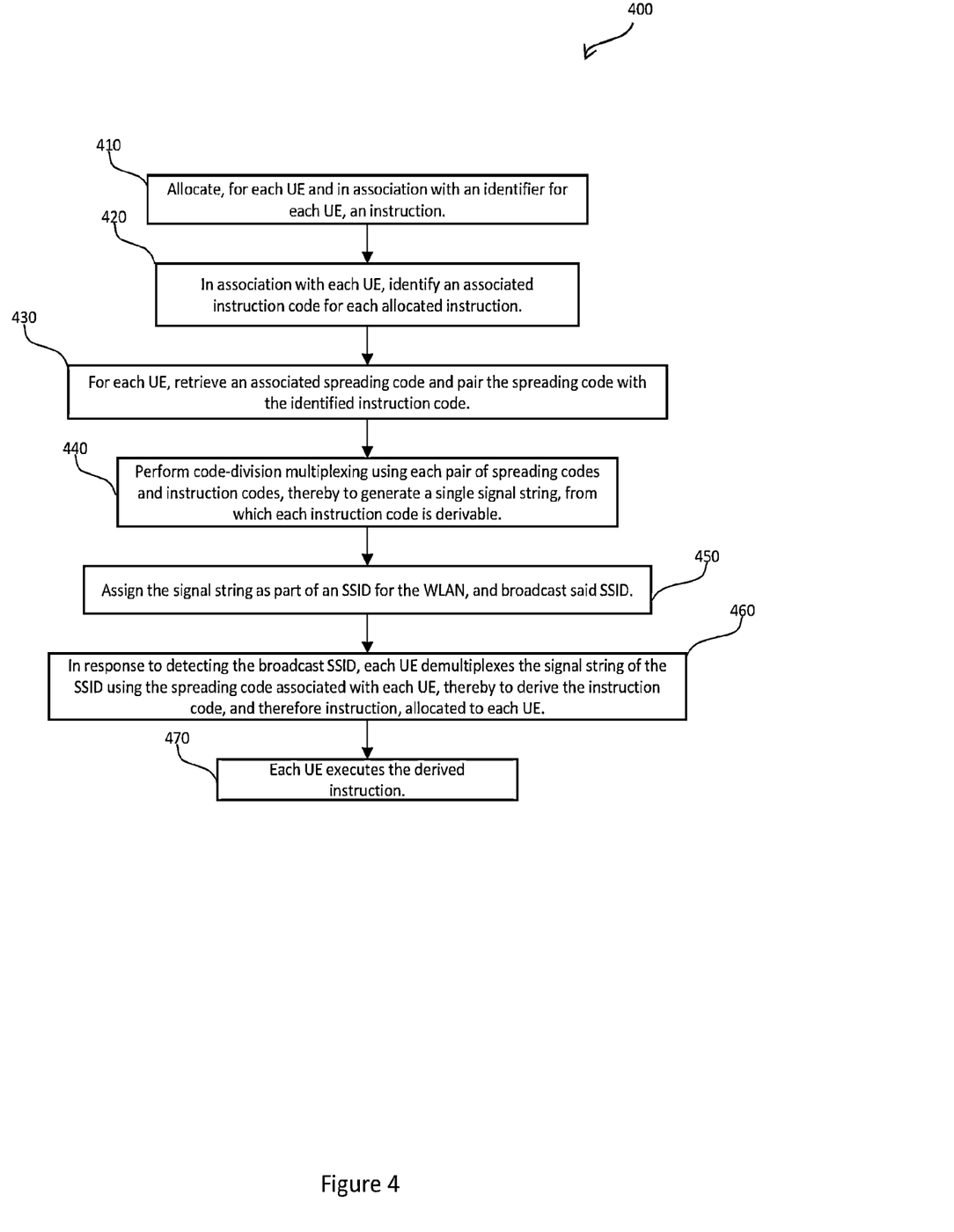
FIG. 4 shows a process for operating the wireless telecommunications network.

FIG. 4 shows an exemplary process 400 by which the WAP 120 is available simultaneously to communicate, using the same broadcast SSID, different instructions to each of the UEs 110, based on a principle of code-division multiplexing.

In a first step 410, instructions are selected from the instruction-code mapping table 220 and allocated to each of the UEs (in association with a unique identifier for each UE). For example, the first UE 110-1 is allocated the instruction "Reboot", and the second UE 110-2 is allocated the instruction "Sleep".

At a next step 420, for each allocated instruction, and in association with the UE for which said instruction is allocated, the processor 210 retrieves, from the WAP instruction-code mapping table 240, the corresponding instruction code.

The processor 210 also retrieves, from the UE-spreading code mapping table 230, the associated spreading code for each of the UEs 110, and each retrieved spreading code is paired with the corresponding identified instruction code 430.

Accordingly, persisting with the example described above, at steps 420 and 430, the processor 210 allocates to the first 110-1 and second 110-2 UEs the instruction codes "100" (i.e. "Reboot") and "011" (i.e. "Sleep") respectively, and then retrieves and pairs the spreading codes "0011" and "0000", respectively.

At a next step 440, the processor 210 performs code-division multiplexing based on each paired spreading code and instruction code, so as to output a single string (also herein referred to as the "signal string") from which an allocated instruction code for a given one of the UEs 110 is decodable (i.e. demultiplexed) by that given UE using the spreading code associated with said UE.

Once the signal string has been generated at step 440, the processor communicates the signal string to the WLAN controller and interface 240, which then configures the SSID of the WLAN 140 to incorporate the signal string. As such, the signal string is effectively broadcast by the WAP as part of the SSID for the WLAN 140.

In response to detecting the signal string as part of the broadcast SSID, each UE 110 demultiplexes the signal string 460 by using its assigned spreading code (as retrieved from the UE spreading code data store 330), so as to output the allocated instruction code. Each UE 110 then derives, from the constituent UE instruction-code mapping table 320, the instruction associated with the output instruction code.

Upon deriving the instruction, each UE then executes the instruction 470. For example, the first UE 110-1 performs a reboot, whereas the second UE 110-2 puts itself to sleep.

Exemplary code-division multiplexing and demultiplexing processes, based on binary instruction and spreading codes, are now described in more detail with reference to Tables 2a, 2b, 3a and 3b below.

To perform code-division multiplexing, as per step 440, the WAP 140 generates a table for each UE 110, such as those exemplarily shown in Tables 2a and 2b below.

In the table for each UE, each digit of the allocated instruction code for a given UE is sequentially mapped to every digit of the allocated spreading code for that same UE, thereby to generate two rows, of the same length, comprising: a spreading code string; and an instruction code string. That is, where the instruction code and the spreading codes comprise n and m digits respectively, the spreading code and instruction code strings are both of n×m digits.

The tables comprise a further row that is the output of an XOR function performed upon the spreading code and the instruction code strings, thereby to output an (n× m digit-long) XOR string.

At a next row, the XOR string is digitised into signed binary form, e.g. such that "1" is converted to "−1" and "0" to "1" (or vice versa), thereby to output a digital string.

For the first UE 110-1, having a spreading code of "0011" and allocated the instruction "Reboot", the following table is therefore output as part of the process of performing code-division multiplexing in step 440:

TABLE 2a

| Element | Digits | | | | | | | | | | | |
|---|---|---|---|---|---|---|---|---|---|---|---|---|
| Spreading code string | 0 | 0 | 1 | 1 | 0 | 0 | 1 | 1 | 0 | 0 | 1 | 1 |
| Instruction code string | 1 | 1 | 1 | 1 | 0 | 0 | 0 | 0 | 0 | 0 | 0 | 0 |
| XOR string | 1 | 1 | 0 | 0 | 0 | 0 | 1 | 1 | 0 | 0 | 1 | 1 |
| Digital string | −1 | −1 | 1 | 1 | 1 | 1 | −1 | −1 | 1 | 1 | −1 | −1 |

Correspondingly, for the second UE 110-2, having a spreading code of "0000" and allocated the instruction "Sleep", the following table is output:

TABLE 2b

| Element | Digits | | | | | | | | | | | |
|---|---|---|---|---|---|---|---|---|---|---|---|---|
| Spreading code string | 0 | 0 | 0 | 0 | 0 | 0 | 0 | 0 | 0 | 0 | 0 | 0 |
| Instruction code string | 0 | 0 | 0 | 0 | 1 | 1 | 1 | 1 | 1 | 1 | 1 | 1 |
| XOR string | 0 | 0 | 0 | 0 | 1 | 1 | 1 | 1 | 1 | 1 | 1 | 1 |
| Digital string | 1 | 1 | 1 | 1 | −1 | −1 | −1 | −1 | −1 | −1 | −1 | −1 |

The digital strings are then summed, digit-wise, across all of the UEs, thereby to output a signal string. In the examples of Tables 2a and 2b, the signal string is therefore "0 0 2 2 0 0 −2 −2 0 0 −2 −2", which is subsequently used in step 450 as part of the SSID for the WLAN 140.

For each of the UEs 110 to perform a corresponding demultiplexing process, as per step 460, each UE generates a table, such as those exemplarily shown in Tables 3a and 3b below.

These tables comprise, in a first row, the signal string as derived by the UE from the detected broadcast SSID associated with the WLAN 140.

At a second row, the allocated spreading code of the UE generating said table is mapped, digit-wise, to the signal string, with the spreading code or instruction code repeating n or m times so as to ensure complete mapping therebetween, and the second row is then converted into signed binary (e.g. 0→1, 1→1) so as to generate a third row for a digital spreading code string.

At a fourth row, for a given UE, the signal string and the digital spreading code string are multiplied digit-wise, thereby to output a multiplied string.

Next, at a fifth row, each sequential block of m digits (i.e. the length of the allocated spreading code) in the multiplied string are summed, thereby to output a sum string of n digits (i.e. the length of the instruction codes).

At a sixth row, the sum string is then normalised by dividing by m, thereby to output a message string.

At a final row, the message string is then processed to reverse the signed binary digitisation ((e.g. 1→0, −1→1), thereby to output a string in the form of an instruction code (i.e. also of n digits and, in this example, in binary form).

For the first UE 110-1, having the spreading code of "0011" and for the detected signal string "0 0 2 2 0 0 −2 −2 0 0 −2 −2", the following table is therefore output as part of the process of performing code-division demultiplexing as per step 460:

TABLE 3a

| Element | Digits | | | | | | | | | | | |
|---|---|---|---|---|---|---|---|---|---|---|---|---|
| Signal string | 0 | 0 | 2 | 2 | 0 | 0 | −2 | −2 | 0 | 0 | −2 | −2 |
| Spreading Code string | 0 | 0 | 1 | 1 | 0 | 0 | 1 | 1 | 0 | 0 | 1 | 1 |
| Digital Spreading Code string | 1 | 1 | −1 | −1 | 1 | 1 | −1 | −1 | 1 | 1 | −1 | −1 |
| Multiplied string | 0 | 0 | −2 | −2 | 0 | 0 | 2 | 2 | 0 | 0 | 2 | 2 |
| Sum string | | | −4 | | | | 4 | | | | 4 | |
| Message string | | | −1 | | | | 1 | | | | 1 | |
| Instruction code | | | 1 | | | | 0 | | | | 0 | |

Correspondingly, for the second UE 110-2, having the spreading code of "0000", the following table is output:

TABLE 3b

| Element | Digits | | | | | | | | | | | |
|---|---|---|---|---|---|---|---|---|---|---|---|---|
| Digital string | 0 | 0 | 2 | 2 | 0 | 0 | −2 | −2 | 0 | 0 | −2 | −2 |
| Spreading Code string | 0 | 0 | 0 | 0 | 0 | 0 | 0 | 0 | 0 | 0 | 0 | 0 |
| Digital Spreading Code string | 1 | 1 | 1 | 1 | 1 | 1 | 1 | 1 | 1 | 1 | 1 | 1 |
| Multiplied string | 0 | 0 | 2 | 2 | 0 | 0 | −2 | −2 | 0 | 0 | −2 | −2 |
| Sum string | | | 4 | | | | −4 | | | | −4 | |
| Message string | | | 1 | | | | −1 | | | | −1 | |
| Instruction code | | | 0 | | | | 1 | | | | 1 | |

As such, based on the mapping in Table 1, it can be seen that the first 110-1 and the second 110-2 UEs derive, from the same signal string, different instruction codes, which in turn correspond to different instructions, i.e. "Reboot" and "Sleep", respectively.

In this way, a single SSID may be used to communicate different instructions to different intended UEs (to an extent that can be accommodated in the SSID, which is normally limited to 32 characters), thereby alleviating the need to transmit instructions to the UEs via (otherwise typically serially-transmitted) data packets communicated via the WLAN 140. Furthermore, where the instruction codes and/ or spreading codes are secret (i.e. known only to the WAP and appropriate UEs), process 400 may also simultaneously achieve the result of concealing what instruction are being communicated, and to which UE.

ALTERNATIVES AND MODIFICATIONS

In an alternative, the WLAN 140 is only visible to the UEs, which are forbidden or unable to connect to the WLAN. In this way, the WLAN merely serves, by means of its SSID, to communicate the instructions to the UEs, rather than to serve as a conventional wireless data network.

In an alternative, steps 410 to 440 are performed by a device that is remote from the WAP, and for example a Cloud-based Device Management System (DSM) that is in communication with the WAP via the wide area network. Accordingly, the processor 210; UE-spreading code mapping table 230; and/or WAP instruction-code mapping table 220 are available to be provided as part of the remote device instead.

In an alternative, the SSID comprises the signal string and an appended pre-defined code (e.g. a prefix and/or suffix) indicating to the UEs 110 the presence of a signal string in the SSID for demultiplexing. Accordingly, for processing efficiency, the UEs, having been preconfigured to identify the appended code, extract the signal string from the SSID and only perform demultiplexing in response to identifying an SSID comprising the appended code.

In an alternative, the instruction is instead, more generally, data or information, such as an alphanumeric or an ASCII symbol. As such, process 400 is available to be used to communicate unique information to each UE, such as network access credentials, and for example a password.

Although the example of FIG. 1 shows only two UEs, it will be appreciated that telecommunications network 100 is available to comprise more UEs, in which process 400 is performed so as to communicate unique sets of instruction to all such UEs. Furthermore, in an alternative, the first and/or second UEs is, or are each, instead a set of a plurality of UEs having the same spreading code.

In one example, for improved security, the signal string is available to be converted into an encrypted string for broadcasting as part of the SSID, and the UEs are configured to decrypt the encrypted string into the signal string.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of operating a wireless telecommunications network, said network comprising a plurality of User Equipment devices, UEs, a Wireless Access Point, WAP, and a Wireless Local Area Network, WLAN, provided by means of the WAP, the method comprising the steps of:

allocating, to each of the plurality of UEs, an item of information;

encoding, by code division multiplexing, the allocated items of information, thereby to output a signal string;

assigning to the WLAN a network identifier, wherein said network identifier is derived from the output signal string;

broadcasting, by means of the WAP, the assigned network identifier;

retrieving, by means of each of the UEs, the signal string from the broadcast network identifier; and subsequently performing, by each of the UEs, code-division demultiplexing upon the retrieved signal string, each given UE thereby outputting the item of information allocated to that given UE.

2. A method according to claim 1, wherein each item of information allocated to each of the UEs is different.

3. A method according to claim 1, wherein each of the UEs is allocated a unique spreading code, and wherein the code-division multiplexing and demultiplexing is performed using the unique spreading code/s.

4. A method according to claim 1, wherein the item of information comprises an instruction.

5. A method according to claim 4, wherein the instruction is an instruction for a UE not to perform an, or any, action.

6. A method according to claim 1, wherein the method is performed without the UE/s connecting, or being connected, to the WLAN.

7. A method according to claim 1, wherein the network identifier is a Service Set Identifier.

8. A method according to claim 1, wherein the signal string is encrypted so as to generate an encrypted signal string that is decryptable by each of the UEs, and wherein the network identifier is derived from said encrypted signal string.

9. A non-transitory computer-readable medium comprising a computer program, which, when the computer program is executed by a computer, causes the computer to carry out the steps of claim 1.

10. A method of operating a Wireless Access Point, WAP, said WAP being provided as part of a wireless telecommunications network, and the WAP providing a Wireless Local Area Network, WLAN, for a plurality of User Equipment devices, UEs, to each of which an item of information is allocated, and wherein the allocated items of information are encoded, by code-division multiplexing, thereby to output a signal string, and the method comprising the steps of:

assigning to the WLAN a network identifier;

wherein said network identifier is derived from the output signal string; and broadcasting the assigned network identifier.

11. A method of operating User Equipment, UE, in a wireless telecommunications network comprising a plurality of UEs, said plurality including the operated UE, a Wireless Access Point, WAP, and a Wireless Local Area Network, WLAN, provided by means of the WAP, wherein the WAP is configured to broadcast a network identifier for the WLAN, wherein a signal string is derivable from the network identifier, and wherein an item of information allocated to each of the plurality of UEs is encoded within the signal string by means of code-division multiplexing, the method comprising the steps of:

identifying the broadcast network identifier;

retrieving the signal string from the broadcast network identifier; and subsequently performing code-division demultiplexing upon the retrieved signal string, thereby to output the item of information allocated to the UE.

12. A wireless telecommunications network comprising:

a plurality of User Equipment devices, UEs;

a Wireless Access Point, WAP;

a Wireless Local Area Network, WLAN, provided by means of the WAP, and identifiable by each of the UEs;

at least one processor configured to:

allocate to each of the UEs an item of information;

encode, by code-division multiplexing, the allocated items of information, thereby to output a signal string; and assign to the WLAN a network identifier, wherein said network identifier is derived from the output signal strings; and wherein the WAP is configured to broadcast, in association with the WLAN, the assigned network identifier; and wherein each of the UEs is configured to:

retrieve the signal string from the broadcast network identifier; and subsequently perform code-division demultiplexing upon the retrieved signal string, thereby to output the item of information allocated to the given UE.

13. A Wireless Access Point, WAP, comprising:

a Wireless Local Area Network, WLAN, interface for providing a WLAN for a plurality of User Equipment devices, UEs, and for broadcasting a network identifier associated with said WLAN;

a receiver for receiving a signal string, said signal string being the output of items of information, allocated to each of the plurality of UEs, that are encoded by code-division multiplexing; and a processor configured to:

instruct the WLAN interface to assign, for the WLAN, a network identifier derived from the received signal string; and to cause the WLAN interface to broadcast the assigned network identifier.

14. User Equipment, UE, operable within a wireless telecommunications network comprising a plurality of UEs, said plurality including the UE, and said UE comprising:

a Wireless Local Area Network, WLAN, interface for connecting to a WLAN, as provided by a Wireless Access Point, WAP, and for identifying a network identifier of the WLAN, as broadcast by the WAP, wherein a signal string is derivable from the network identifier, and wherein an item of information allocated to each of the UEs is encoded within the signal string by means of code-division multiplexing; and a processor configured to:

derive the signal string from the broadcast network identifier; and perform code-division demultiplexing upon the signal string, thereby to output the item of information allocated to the UE.

* * * * *